(12) United States Patent
Mordukhovich et al.

(10) Patent No.: US 7,766,144 B2
(45) Date of Patent: Aug. 3, 2010

(54) CLUTCH PLATE WITH INTERNAL FLUID CHANNELS

(75) Inventors: Gregory Mordukhovich, Bloomfield Hills, MI (US); Paul D. Stevenson, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 362 days.

(21) Appl. No.: 11/534,695

(22) Filed: Sep. 25, 2006

(65) Prior Publication Data

US 2008/0073171 A1    Mar. 27, 2008

(51) Int. Cl.
*F16D 13/72* (2006.01)
*F16D 13/74* (2006.01)

(52) U.S. Cl. .............................. 192/70.12; 192/113.34; 192/113.36

(58) Field of Classification Search .............. 192/70.12, 192/113.26, 113.35
See application file for complete search history.

(56) References Cited

U.S. PATENT DOCUMENTS

| | | | | |
|---|---|---|---|---|
| 2,976,975 | A * | 3/1961 | Thostenson et al. ...... | 192/70.12 |
| 3,805,935 | A * | 4/1974 | Armstrong ............. | 192/113.26 |
| 3,809,192 | A * | 5/1974 | Stehle .................. | 188/218 XL |
| 4,294,343 | A * | 10/1981 | Reh ....................... | 192/113.23 |
| 4,470,485 | A * | 9/1984 | Warwick .................. | 188/71.6 |
| 4,674,616 | A | 6/1987 | Mannino, Jr. | |
| 5,240,095 | A * | 8/1993 | Shimamura et al. ...... | 192/70.12 |
| 6,283,265 | B1 * | 9/2001 | Hirayanagi et al. ...... | 192/70.12 |
| 6,360,864 | B1 | 3/2002 | Thomas et al. | |
| 2005/0126874 | A1 * | 6/2005 | Back et al. .................. | 192/3.3 |

* cited by examiner

*Primary Examiner*—Rodney H Bonck
(74) *Attorney, Agent, or Firm*—Quinn Law Group, PLLC

(57) ABSTRACT

A clutch plate assembly is provided having a friction interface and internal fluid passages for delivering pressurized fluid to the friction interface to cool the interface, and to reduce spin losses through the clutch assembly. The fluid passages comprise a plurality of primary passages extending inward from a clutch plate inner or outer diameter, and a plurality of secondary fluid passages intersecting the primary fluid passages for conducting fluid to the friction interface. Fluid is directed to the friction interface during clutch engagement for cooling thereof when the clutch assembly is engaging, and separates the clutch plates to reduce spin losses when the clutch assembly is disengaged. A method is also provided for controlling fluid flow at the friction interface, including providing fluid directly to the interface for cooling when the clutch plate assembly is engaging, and for reducing spin losses when the clutch plate assembly is substantially disengaged.

9 Claims, 3 Drawing Sheets

CLUTCH PLATE WITH INTERNAL FLUID CHANNELS

TECHNICAL FIELD

The present invention relates to a clutch assembly having a clutch plate with a plurality of internal fluid passages configured for conducting pressurized fluid directly to the friction interface for cooling of the interface and for reducing spin losses.

BACKGROUND OF THE INVENTION

In an automotive transmission, clutch assemblies are commonly used to transmit rotational motion or torque between two rotating members, such as an engine crankshaft and a transmission driveshaft. Standard friction-type clutch assemblies, or friction clutches, include a series of alternating friction and reaction plates that together make up a clutch pack, with the clutch pack being disposed within an outer clutch drum. The friction plate typically has a layer of rough friction material which is bonded or otherwise attached to the primary contact surfaces of a metal core plate, while the reaction plate typically has a relatively smooth contact surface configured to oppose the friction plate when the friction clutch is engaged. The friction clutch is engaged or applied using a controllable hydraulic force supplied by a transmission pump. The force actuates an apply mechanism, such as a clutch-apply piston, to selectively compress the friction and reaction plates of the clutch pack. Once compressed, the alternating plates become interlocked due to the friction forces imparted by the apply force and the friction material, thereby allowing the rotating members to rotate in unison.

Friction clutches may be of the dry-plate or wet-plate variety, with wet-plate friction clutches providing enhanced thermal performance due to the cooling qualities of the pressurized lubricating fluid. In particular, the enhanced thermal performance is accomplished by passing or directing the pressurized fluid, such as transmission fluid or oil, through and around the mating clutch surfaces to dissipate heat generated by the friction forces in proximity to the friction interface between the surfaces. Lubricated surface cooling of friction clutch plates is often provided via a series of shallow radial channels or grooves along the contact surfaces of the friction plates, with the grooves being pressed into or formed on a separate bonded friction material layer, or defined by the gaps between discrete patches of friction material. However, as such patches and/or surface grooves reduce the total contact area between the mating clutch surfaces, surface temperature may increase along the remaining contact surfaces, resulting in less than optimum overall plate cooling. Also, spin losses may occur while the clutch assembly is disengaged as friction forces create drag between the plates.

SUMMARY OF THE INVENTION

Accordingly, an engageable clutch assembly is provided having a friction interface adapted for use with a pressurized fluid, the assembly comprising at least one clutch plate having at least one internal fluid passage and at least one reaction surface at least partially defining the friction interface, wherein the at least one fluid passages is configured to conduct the pressurized fluid directly to the friction interface for cooling of the friction interface when the clutch assembly is engaging, and for reducing spin losses through the clutch assembly when the clutch assembly is disengaged.

In one aspect of the invention, there are a plurality of internal fluid passages, with at least one of the fluid passages being plugged at one end to prevent flow of fluid in one direction as needed.

In another aspect of the invention, the fluid passages include at least one main or primary fluid passage and at least one secondary fluid passage intersecting at least one of the main or primary fluid passages in a perpendicular direction.

In another aspect of the invention, the thickness of the clutch plate and the diameter of at least one of the primary and secondary fluid passages are proportionately related by a ratio of approximately 2:1.

In another aspect of the invention, the clutch plate is a unitary friction/reaction plate with friction material on one side.

In another aspect of the invention, a method is provided for controlling fluid flow at the friction interface of a clutch plate assembly. The method includes providing fluid directly to the friction interface to cool the interface when the clutch plate assembly is engaging, and providing fluid to the friction interface when the clutch plate assembly is disengaged to thereby reduce spin losses through the clutch plate assembly.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
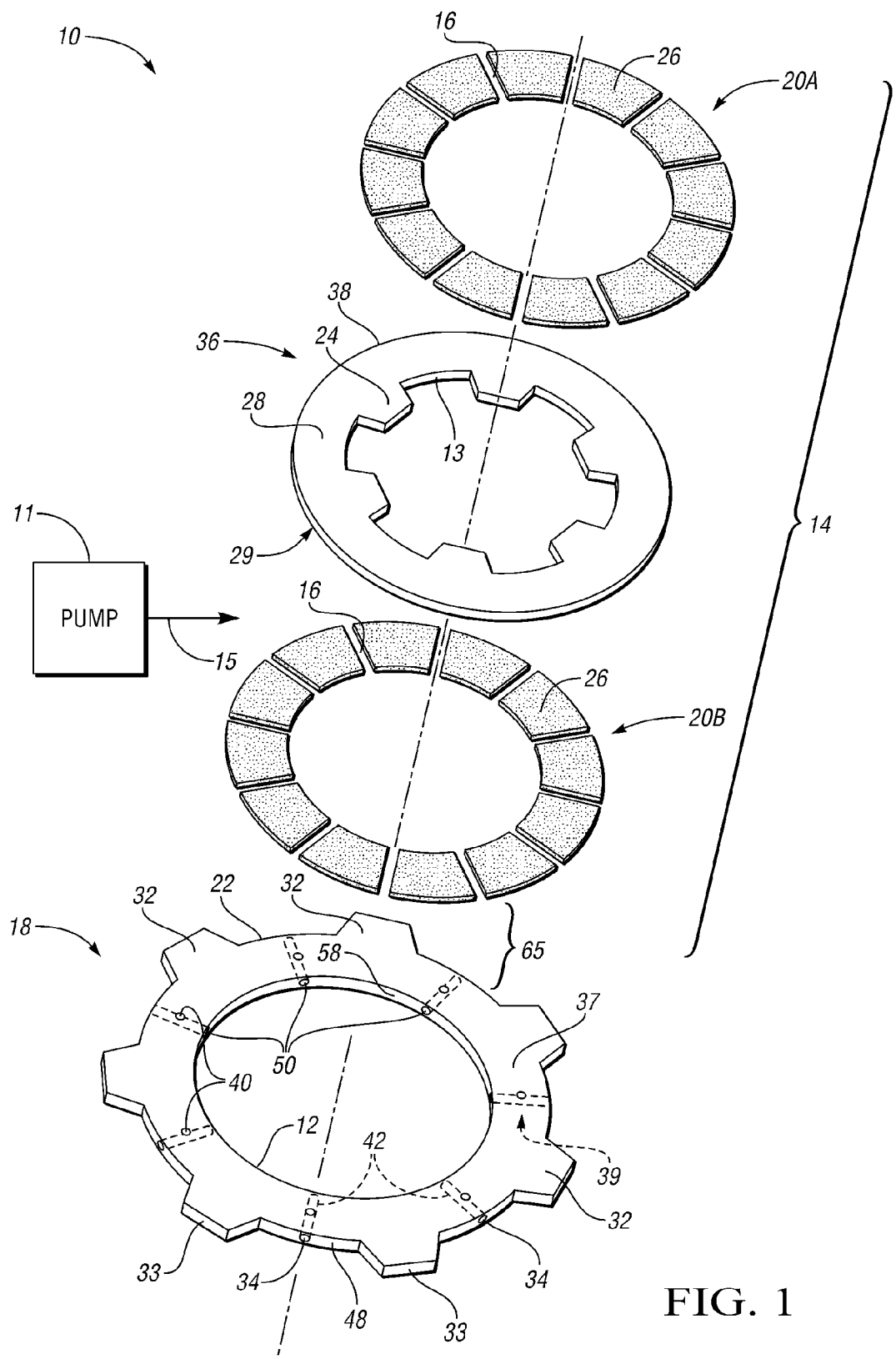
FIG. 1 is an exploded view of a friction clutch assembly having a dual reaction plate and friction plate with a friction interface according to the invention.

Referring to the drawings wherein like reference numbers correspond to like or similar components throughout the several figures, there is shown in FIG. 1 an exploded view of a clutch plate assembly 10 having a friction plate 14 and a reaction plate 18, and a friction interface 65 therebetween. For simplicity, only one friction plate 14 is shown, however those skilled in the art will recognize that clutch plate assembly 10 may consist of any number of alternately arranged friction plates 14 and reaction plates 18, depending on the specific clutch application. Friction plate 14 has a core plate 36 having a first and second main surface 28, 29, respectively, the core plate 36 preferably constructed of a suitable grade of stainless steel and having a plurality of inwardly-extending splines 24 configured to mate or interlock with alternating grooves of an adjoining clutch hub (not shown).

Preferably, first and second main surfaces 28, 29 each have a layer of friction material 20A, 20B, respectively, which is bonded or otherwise attached to surfaces 28, 29 of the core plate 36, although friction material such as 20A, 20B may also be bonded directly to a unitary friction/reaction plate (not shown). The friction material 20A, 20B is preferably ring-shaped and sized to cover the primary surface 28, 29 of the core plate 36 to which the friction material is bonded, and further includes a plurality of surface fluid channels 16 that separate the friction material layer 20A, 20B into substantially equal patches or segments for directing pressurized fluid 15 between the outer diameter 38 and the inner diameter 13 of the core plate 36, or between the inner diameter 13 and the outer diameter 38, depending on the design of the clutch assembly 10. While the friction material 20A, 20B as shown in FIG. 1 have fluid channels 16 as shown, other styles or designs of friction material may also be used within the scope of the invention, including, for example, smooth or grooveless material, or a series of surface channels or grooves that are pressed partially through the thickness of the friction material 20A, 20B.

Friction plate 14 is configured to press against and synchronize with the speed of the mating reaction plate 18 when a controllable source of hydraulic pressure, preferably a positive displacement transmission pump 11, actuates or engages an apply mechanism such as clutch-apply piston (not shown) to selectively compress the alternating friction plates 14 and reaction plates 18 that make up the clutch assembly 10. As plates 14, 18 become interlocked due to the friction forces imparted by the layer of friction material 20B, the clutch plate assembly is thereby engaged, and the mating plates 14, 18 are permitted to rotate in unison.

Reaction plate 18 is a preferably circular metallic ring of a suitable grade of stainless steel having an outer and inner diameter 22, 12, respectively, and includes a plurality of outwardly extending splines 32 configured to mate or interlock with a plurality of grooves positioned on the inside surface of a mating clutch drum (not shown). The reaction plate 18 has a first main surface 37 and a reverse or second main surface 39 (see FIG. 2A), with main surfaces 37, 39 being at least as wide as the width of friction material 20A, 20B to allow for maximum frictional contact area between mating plates such as plates 14 and 18. The reaction plate 18 also has outer and inner lateral or side surfaces 48, 58, respectively, each having a width/height sufficient to provide the reaction plate 18 with adequate bending and surface strength without adding excessive weight for a given clutch application, and with sufficient thickness to accommodate the drilling of fluid passages therein as described hereinbelow.

Reaction plate 18 is further provided with a plurality of primary fluid passages 42 extending radially inward through the reaction plate 18 from outer lateral surface 48 to inner lateral surface 58, preferably perpendicularly with respect to the lateral surfaces 48, 58 as shown in FIG. 1 and substantially parallel to the main surfaces 37, 39. Each of primary fluid passages 42 are in fluid communication with a source 11 of pressurized fluid 15 which is configured to deliver the fluid 15 through one of the outer or inner orifices 34, 50 of primary fluid passage 42, depending on the application. Orifices 34, 50, along with primary fluid channels 42, are preferably circular or cylindrical in shape so as to minimize the effects of fluid friction and are preferably positioned approximately midway up lateral surfaces 48, 58 and approximately halfway between main surfaces 37, 39 of reaction plate 18, and approximately midway between each of the outer splines 32, so as to minimize the amount of material that must be removed from the reaction plate 18 during forming or drilling of the primary fluid passages 42. However, those skilled in the art will recognize that the location of the outer orifices 34 may be positioned in alternate locations along or around the outer lateral surface 48. For example, each of outer orifices 34 may be positioned on a respective spline face 33 of an outer spline 32 to thereby increase the area of potential fluid/metal contact for an enhanced fluid cooling effect.

Figure 2A:
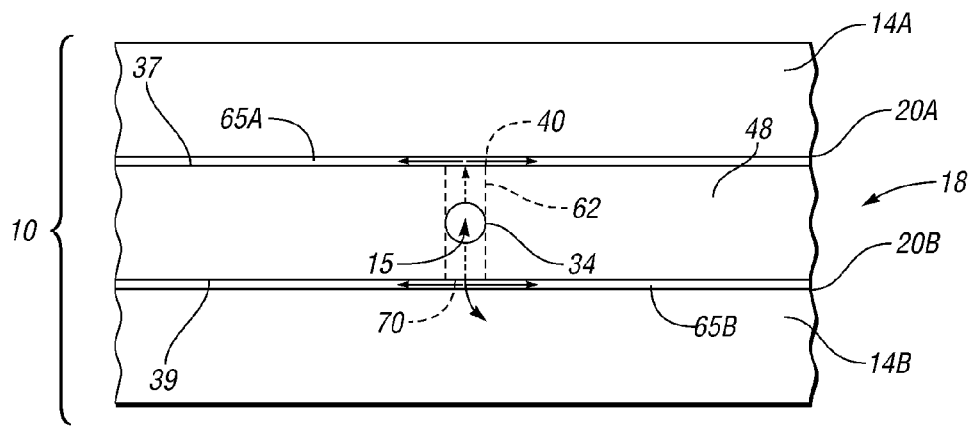
FIG. 2A is a fragmentary side view of a portion of a reaction plate between adjacent friction plates, each forming a friction interface with the reaction plate according to one embodiment of the invention.
Figure 2B:
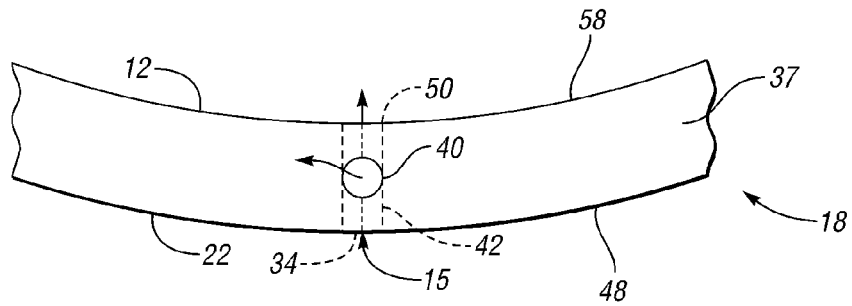
FIG. 2B is a fragmentary top view of a portion of the reaction plate according to the invention.

Turning to FIG. 2A, which is a side view of a portion of the clutch plate assembly 10, a reaction plate 18 is disposed between a pair of friction plates 14A, 14B, forming or defining a pair of boundary or friction interfaces 65A, 65B between the friction plates 14A, 14B and the reaction plate 18, respectively. Outer orifice 34 admits a flow of pressurized fluid 15 from outer lateral surface 48 into the reaction plate 18, as previously explained herewithin. For delivery of fluid 15 directly to the friction interfaces 65A, 65B for the cooling of main surfaces 37, 39, the reaction plate 18 is further provided with a preferably circular or cylindrical secondary fluid passage 62 having a pair of circular or cylindrical first and second orifices 40 and 70, respectively, each in fluid communication with primary fluid passage 42 through the secondary fluid passage 62.

In the preferred embodiment, first and second orifices 40, 70 are each positioned on main surfaces 37, 39, respectively, at opposite ends of secondary fluid passage 62 and open to the friction interfaces 65A, 65B between reaction plate 18 and friction plates 14A, 14B, respectively. First orifice 40 is positioned on the main surface 37 of reaction plate 18 directly above primary fluid passage 42 and approximately midway between the respective outer and inner diameters 22, 12 of the reaction plate 18, and second orifice 70 is positioned on the second primary surface 39 directly below primary fluid passage 42. While FIG. 1 shows just one first and second orifice 40, 70, those skilled in the art will recognize that additional orifices substantially identical to first and second orifices 40, 70 may be added as needed depending on the size/width of the reaction plate and/or desired cooling/lubricating requirements of a given clutch plate assembly design.

During a transient high temperature, low relative velocity condition, i.e. the low speed conditions most likely to cause shudder or vibration due to slippage, the secondary fluid passage 62 takes advantage of the relatively low viscosity of the fluid 15 under high temperature conditions to draw the fluid from primary fluid passage 42 directly to the low local pressure region created in proximity to the first and second orifices 34, 70. Without requiring a reduction in contact surface area of the friction material 20A, 20B, shudder or vibration at low relative rotational speed is thereby reduced in part by delivering the fluid 15 directly to the friction interfaces 65A, 65B as needed. When the clutch assembly 10 is rotating in unison at relatively high rates of speed, the low pressure region formed in proximity to first and second orifices 40, 70, respectively, between the disparately rotating plates 14, 18 disappears, and the various plates of the clutch assembly 10 are pressed together, thereby substantially blocking the flow of fluid 15 through the orifices 40, 70. In this manner, loss of excess fluid 15 into the friction interfaces 65A, 65B helps to preserve fluid and prevent flooding of the friction interfaces 65A, 65B, thus minimizing the hydroplaning effect between friction plates 14A, 14B and reaction plate 18. Those skilled in the art will recognize that when clutch assembly 10 is disengaged, fluid 15 will continue to be fed at line pressure through the orifices 40, 70, which will provide a hydraulic force at the friction interfaces 65A, 65B sufficient to separate the various adjacent plates, such as friction plates 14 and reaction plate 18 and reducing or minimizing the spin losses or drag therebetween.

Figure 3A:
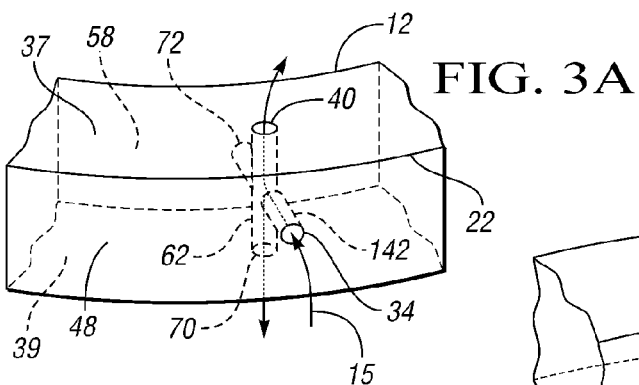
FIG. 3A is a fragmentary perspective view of a reaction plate having a blind hole according to a second embodiment of the invention.
Figure 3B:
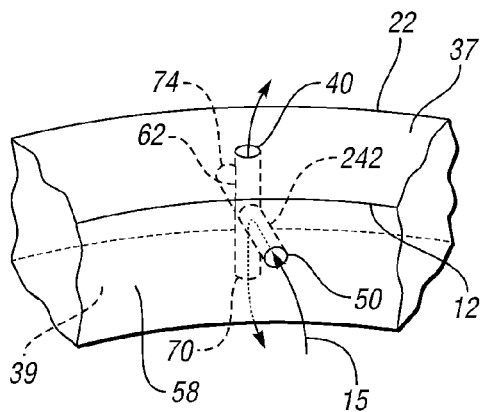
FIG. 3B is a fragmentary perspective view of a portion of a reaction plate having an alternately oriented blind hole according to the second embodiment of the invention.

In a second embodiment shown in FIG. 3A, a blind primary fluid passage 142 is shown extending or penetrating from the outer lateral surface 48 to a closed or blind end 72 of primary fluid passage 142 which is short of the inner diameter 12 of reaction plate 18. As configured, fluid 15 may enter the outer orifice 34, pass through primary fluid passage 142, and exit first and second orifices 40, 70 as previously explained herewithin. However, due to the blind end 72 of primary fluid passage 142, the fluid 15 is blocked or prevented from passing all the way through to the inner diameter 12. Fluid 15 is conserved in this manner while still being drawn by the local low pressure zone between plates 14A, 14B and 18 through secondary fluid passages 62 to reach the friction interface 65A, 65B (see FIG. 2A). Alternately, as shown in FIG. 3B, in situations or configurations in which flow of the fluid 15 initiates from the inner lateral surface 58 of internal diameter 12, an alternate primary fluid passage 242 may extend or penetrate from the inner diameter 12 to a closed or blind end 74 of primary fluid passage 242. The blind end 74 is short of the outer diameter 22 of reaction plate 18. Both blind ends 72 and 74 are preferably positioned approximately ¾ of the distance between the inner diameter 12 and outer diameter 22 of reaction plate 18 to allow for some additional core cooling of reaction plate 18, although other distances are also within the scope of the invention.

Figure 3C:
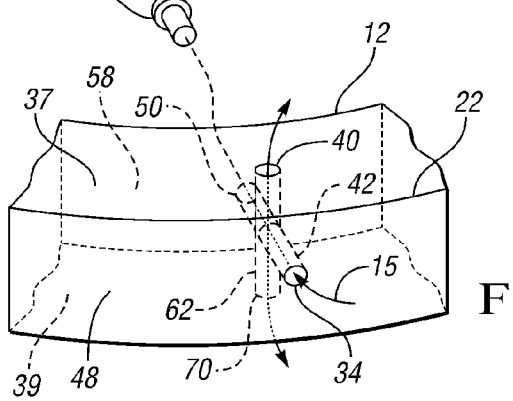
FIG. 3C is a fragmentary perspective view of a portion of a reaction plate having a selectively pluggable inner orifice according to a third embodiment of the invention.

In a third embodiment as shown in FIG. 3C, primary fluid passage 42 extends all the way through reaction plate 18 from inner diameter 12 to outer diameter 22, and is capped or otherwise blocked, preferably by a plug 67 that is inserted into the inner orifice 50, thus blocking fluid 15 from flowing all the way through reaction plate 18. This embodiment facilitates a drilling or boring process initiating from within the inner diameter 12 of the reaction plate 18, as may be required to produce the embodiment of FIG. 3B, particularly in situations in which the reaction plate 18 is relatively small in diameter. Preferably, the plug 67 is constructed of suitable material such as stainless steel when the plus is to be inserted into inner orifice 50 and secured with epoxy or other adhesive material (not shown) with sufficient strength and materials properties to retain the plug 67 within the inner orifice 50 in the presence of fluid 15 for the operational lifetime of the reaction plate 18.

Figure 4A:
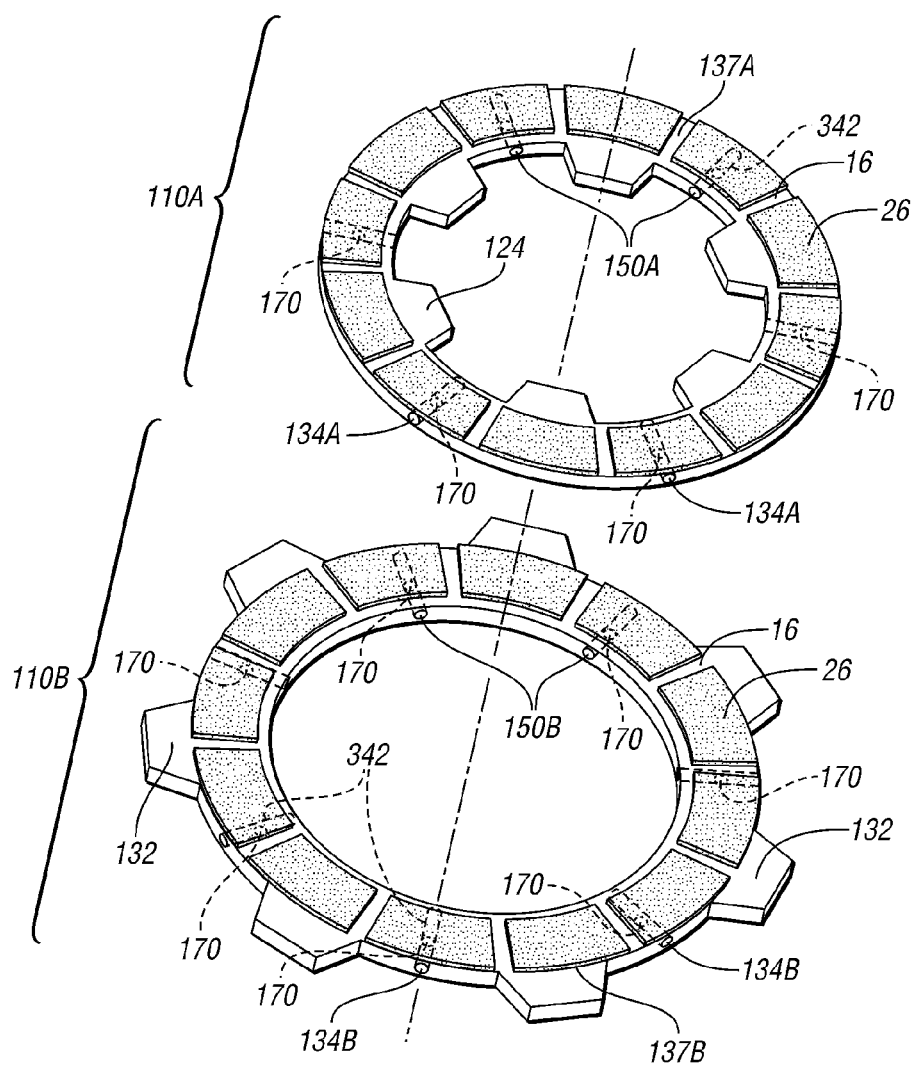
FIG. 4A is an exploded view of a friction clutch assembly having unitary friction/reaction plates according to a fourth embodiment of the invention.
Figure 4B:
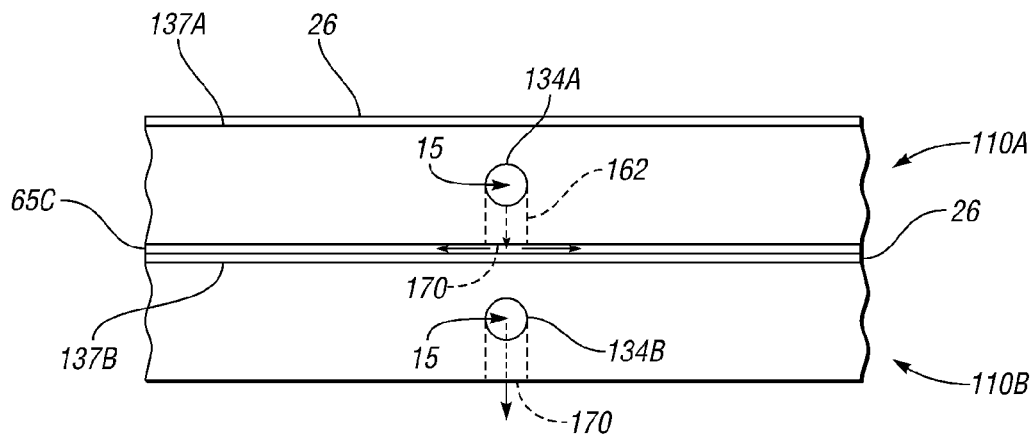
FIG. 4B is a fragmentary side view of a portion of pair of unitary friction/plates forming a friction interface therebetween according to the fourth embodiment of the invention.

Referring to FIG. 4A, while a multi-plate design is preferred, a fourth embodiment includes unitary friction/reaction plates 110A, 110B as shown in FIG. 4A, which are stacked without a separate core plate 36 (see FIG. 1). Friction material 26 is bonded or attached directly to one surface 137A, 137B of each unitary plate 110A, 110B, respectively, with each unitary plate 110A, 110B having respective alternating internally and externally projecting splines 124, 132. Unitary plate 110A has an internal orifice 150A and an external orifice 134A disposed at either end of at least one primary fluid passage 342, each of which is intersected by a secondary fluid passage 162 having a single orifice 170. Likewise, unitary plate 110B has an internal orifice 150B and an external orifice 134B disposed at either end of at least one primary fluid passage 342, with primary fluid passages 342 being substantially identical to passage 42 as previously described hereinabove (see FIG. 1). In this fourth embodiment, as shown in partial side view in FIG. 4B, only one friction interface 65C will be formed relative to each pair of unitary plates 110A, 110B, and accordingly, only a single orifice 170 would be required opening thereto from each of primary fluid passages 342, although multiple secondary passages 162 and orifices 170 may be added as needed to deliver more fluid 15 to the friction interface 65C as required. Orifices 134A and 150A, and primary fluid passage 342 may also be configured using blind or plugged holes as previously described herewithin as the application or clutch design requires.

While the best modes for carrying out the invention have been described in detail, those familiar with the art to which this invention relates will recognize various alternative designs and embodiments for practicing the invention within the scope of the appended claims.

The invention claimed is:

1. An engageable clutch assembly having a friction interface adapted for use with a pressurized fluid, the clutch assembly being adapted for reducing clutch shudder or vibration due to slippage across the clutch assembly, the clutch assembly comprising:
 a rotatable friction plate with friction material attached to a side thereof, the friction material defining a plurality of surface fluid channels;
 a rotatable reaction plate having a reaction surface adjacent to the friction material, wherein the friction plate and the reaction plate define the friction interface at a location therebetween; and
 wherein the reaction plate defines a plurality of internal fluid passages that intersect with each other within the reaction plate and are in fluid communication with the friction interface and the surface fluid channels, and wherein the internal fluid passages are configured to conduct the pressurized fluid through the reaction plate in a radial direction during all conditions, and through the reaction plate directly to a low pressure region of the friction interface in an axial direction during a transient high temperature, low relative velocity condition of the clutch assembly, thereby reducing the clutch shudder or vibration during the transient high temperature, low relative velocity condition.

2. The clutch assembly of claim 1, wherein at least one of the internal fluid passages is plugged at one end to prevent flow of the pressurized fluid in the radial direction.

3. The clutch assembly of claim 1, wherein the thickness of the reaction plate and the diameter of at least one of the fluid passages are proportionately related by the ratio of approximately 2:1.

4. A clutch assembly comprising:
 an engageable and rotatable reaction plate; and
 a friction plate defining a friction interface in conjunction with the reaction plate comprising:
 wherein the reaction plate includes:
  at least one reaction surface;
  an outer diameter surface;
  an inner diameter surface;
  a plurality of primary internal fluid passages in fluid communication with a source of pressurized fluid through the reaction plate; and
  a plurality of secondary internal fluid passages each in fluid communication, through the reaction plate, with the at least one reaction surface, the inner diameter surface, the outer diameter surface, and a respective one of the primary fluid passages, thereby delivering pressurized fluid from one of the inner diameter surface and the outer diameter surface to the at least one reaction surface as needed during a transient high temperature, low relative velocity condition of the clutch assembly;

wherein:
the secondary internal fluid passages are configured to conduct the pressurized fluid through the reaction plate in a radial direction during all conditions, and directly to a low pressure region of the friction interface in an axial direction when drawn therethrough during the transient high temperature, low relative velocity condition of the clutch assembly, thereby reducing clutch shudder or vibration during the transient high temperature, low relative velocity condition;

the flow of the fluid through the plurality of secondary internal fluid passages being blocked when the reaction plate rotates in unison with the friction plate; and a thickness of the reaction plate and a diameter of at least one of the primary and the secondary fluid passages are proportionately related by a ratio of approximately 2:1.

5. The clutch assembly of claim 4, wherein each of the secondary fluid passages intersects at least one of the primary fluid passages within the reaction plate in a substantially perpendicular direction.

6. The clutch assembly of claim 4, wherein at least one of the plurality of internal fluid passages is a blind passage leading from one of said outer and said inner diameter surfaces and extending approximately ¾ of the distance to the other of said inner and said outer diameter surfaces.

7. A method of controlling fluid flow at a friction interface of a clutch plate assembly having a first plate with friction material defining a plurality of surface fluid channels and a second plate with a reaction surface, the second plate defining a plurality of internal fluid passages each including a radial fluid passage and an axial fluid passage intersecting the radial fluid passage and adapted for conducting fluid directly to the friction interface, the method comprising:

drawing the fluid through second plate in the axial direction directly to a low pressure region of the friction interface during transient high temperature, low relative velocity conditions, thereby reducing spin losses when the clutch plate assembly is disengaged; and providing the fluid to the friction interface through the radial fluid passages and the surface fluid channels at a calibrated line pressure when the clutch plate assembly is engaged to cool the friction interface.

8. The method of claim 7, wherein each of the axial fluid passages is substantially perpendicular to the radial fluid passage intersected thereby.

9. The method of claim 7, wherein the thickness of the reaction plate and the diameter of at least one of the at least one primary fluid passage and the at least one secondary fluid passage are proportionately related by a ratio of approximately 2:1.

* * * * *